United States Patent [19]

Kobayashi et al.

[11] Patent Number: 5,263,398
[45] Date of Patent: Nov. 23, 1993

[54] BRAKE BOOSTER FOR PREVENTING UNWANTED REACTION DISC DEFORMATION

[75] Inventors: Kazuo Kobayashi; Makoto Watanabe, both of Saitama, Japan

[73] Assignee: Jidosha Kiki Co., Ltd., Tokyo, Japan

[21] Appl. No.: 886,076

[22] Filed: May 20, 1992

[30] Foreign Application Priority Data

Jun. 14, 1991 [JP] Japan .................. 3-169471
Aug. 23, 1991 [JP] Japan .................. 3-236986
Aug. 30, 1991 [JP] Japan .................. 3-245266

[51] Int. Cl.⁵ .................................. F15B 9/10
[52] U.S. Cl. ................... 91/369.2; 91/376 R; 92/99; 92/100
[58] Field of Search ............... 91/369.1, 369.2, 369.3, 91/376 R; 92/48, 96, 98 R, 99, 100; 60/547.1

[56] References Cited

U.S. PATENT DOCUMENTS

| | | | |
|---|---|---|---|
| 3,082,744 | 3/1963 | Gardner | 91/369.2 |
| 3,172,334 | 3/1965 | Wuellner et al. | 91/376 |
| 4,425,760 | 1/1984 | Furuta | 91/369.3 X |
| 4,494,443 | 1/1985 | Tsubouchi | 91/376 R X |
| 4,643,075 | 2/1987 | Wagner | 91/369.2 |
| 4,862,787 | 9/1989 | Suzuki et al. | 91/369.2 |
| 4,882,980 | 11/1989 | Arino et al. | 92/48 |

FOREIGN PATENT DOCUMENTS 54-111061 8/1979 Japan .
60-193753 10/1985 Japan .
2-38425 8/1990 Japan .

*Primary Examiner*—Edward K. Look
*Assistant Examiner*—Hoang Nguyen
*Attorney, Agent, or Firm*—Flynn, Thiel, Boutell & Tanis

[57] ABSTRACT

An improvement of a reaction transmitting mechanism for a booster is disclosed. A forward end face of a tubular portion of a valve body which abuts against a reaction disc is provided with an uneven surface. This presents a resistance to an elastic deformation of the reaction disc when a brake booster is actuated. Accordingly, an enhanced hysteresis, which represents a difference in the output between when depressing and releasing a brake pedal, is provided without increasing the hardness of the reaction disc.

15 Claims, 7 Drawing Sheets

5,263,398

BRAKE BOOSTER FOR PREVENTING UNWANTED REACTION DISC DEFORMATION

FIELD OF THE INVENTION

The invention relates to a booster, and in particular, to an improvement of a reaction transmitting mechanism for a booster.

DESCRIPTION OF THE PRIOR ART

A booster is known in the art which comprises a valve body slidably disposed within a shell, a valve plunger slidably fitted into the valve body and mechanically coupled to an input shaft, an output shaft having its one end slidably fitted in the valve body and such end disposed in opposing relationship with a forward end face of the valve plunger, and a reaction disc interposed between said one end of the output shaft and the end face of the valve body and disposed in opposing relationship with the forward end face of the valve plunger for transmitting a reaction to an output which acts upon the output shaft to the input shaft through the valve plunger, with a clearance being formed between the reaction disc and the valve plunger in an inoperative condition in which the input shaft is not driven forward (see, for example, Japanese Laid-Open Patent Applications No. 111,061/1979 and No. 193,753/1985 and Japanese Patent Publication No. 38,425/1990).

In the described booster, when the booster is operated by driving the input shaft forward, the reaction disc is axially compressed to thereby cause an axial portion of the reaction disc to bulge toward the forward end face of the valve plunger to bring the reaction disc into abutment against the valve plunger, thereby allowing an output of a given servo ratio to be obtained from the output shaft. The output rises rapidly upon abutment of the reaction disc against the valve plunger, and such rapid rise is commonly referred to as a jumping.

In the booster disclosed in Japanese Patent Publication No. 38,425/1990, a rubber having an increased value of hardness is used as a material to form the reaction disc to provide an enhanced hysteresis, which represents a difference in the output which occurs upon depressing a brake pedal and upon releasing it, thereby achieving a good brake feeling which a driver can experience.

However, the use of a rubber having an increased hardness for the reaction disc in order to secure an enhanced hysteresis results in a value of hardness of the reaction disc when the booster is used under a low temperature environment which is higher than when it is used under normal temperatures. As a consequence, the magnitude of jumping increases under low temperatures over the values experienced at normal temperatures, thus detracting from the brake feeling which a driver experiences.

SUMMARY OF THE INVENTION

In view of the foregoing, the invention relates to a booster comprising a valve body slidably disposed within a shell, a valve plunger slidably fitted into the valve body and mechanically coupled to an input shaft, an output shaft having its one end slidably fitted in the valve body and having such end disposed in opposing relationship with the forward end face of the valve plunger, and a reaction disc interposed between said one end of the output shaft and an end face of the valve body in opposing relationship with the forward end face of the valve plunger for transmitting a reaction to an output which acts upon the output shaft to the input shaft through the valve plunger, with a clearance being formed between the reaction disc and the valve plunger in an inoperative condition when the input shaft is not driven forward. In accordance with the invention, an uneven surface which prevents an elastic deformation of the reaction disc from the outside toward the inside is formed on at least one of the end face of the valve body which abuts against the end face of the reaction disc and the end face of said one end of the output shaft.

With this arrangement, when the reaction disc is axially compressed as a result of operation of the booster, the presence of the uneven surface presents a resistance to the elastic deformation of the reaction disc in the radially inward direction.

Consequently, an enhanced hysteresis can be secured without increasing the hardness of the reaction disc in accordance with the invention, thereby allowing a good brake feeling to be imparted to a driver.

Above and other objects, features and advantages of the invention will become apparent from the following description with reference to the attached drawings.

DETAILED DESCRIPTION OF EMBODIMENTS

Figure 1:
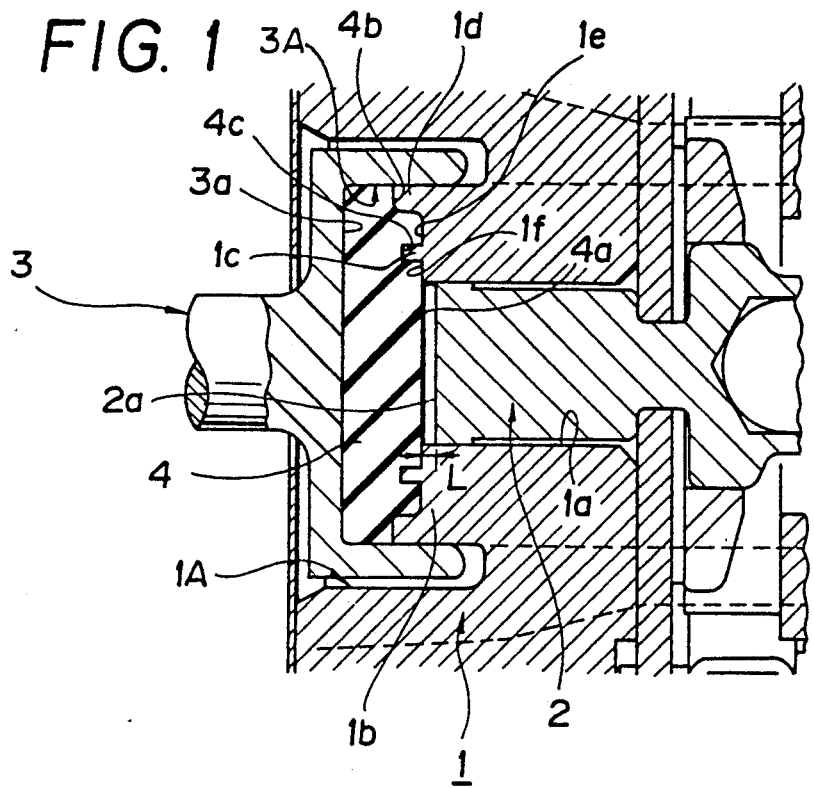
FIG. 1 is a longitudinal section of one embodiment of the invention.

Referring to the drawings, FIG. 1 shows an essential part of a brake booster of negative pressure type which is located within a shell thereof. In FIG. 1, a valve body 1 is slidably disposed within a shell, not shown, and includes a shank in which a stepped opening 1A is formed. To the right of the stepped opening 1A, the valve body includes a portion 1a of a reduced diameter, in which a valve plunger 2, forming a valve mechanism, is slidably fitted. The right end of the valve plunger 2 is mechanically coupled to an input shaft, not shown.

A step in the stepped opening 1A formed in the valve body 1 continues to the left as an extended tubular portion 1b, over which a recess 3A formed in one end of an output shaft 3 is slidably fitted. A reaction disc 4 formed of rubber is received in the recess 3A of the output shaft 3, and the right-hand end face 4a of the reaction disc 4 abuts against a forward end face of the tubular section 1b of the valve body 1 around the outer periphery thereof. In this manner, the reaction disc 4 is held sandwiched between the end face 3a of the recess 3A of the output shaft 3 and the forward end face of the tubular portion 1b while the right-hand end face 4a of the reaction disc 4 is simultaneously disposed in opposing relationship with a forward end face 2a of the valve plunger 2. In the inoperative condition of the brake booster shown in FIG. 1, a given clearance L is defined between the right-hand end face 4a of the reaction disc 4 and the forward end face 2a of the valve plunger 2.

The described arrangement as well as its operation remains unchanged from a conventional brake booster of negative pressure type. Specifically, when a brake pedal is depressed under the inoperative condition shown to drive an input shaft forward, the reaction disc 4 becomes axially compressed. The right-hand end face 4a of the compressed reaction disc 4 bulges toward the forward end face 2a of the valve plunger 2 in its axial portion, whereby the clearance L is removed and the right-hand end face 4a of the reaction disc 4 abuts against the forward end face 2a of the valve plunger 2. An output of a given servo ratio can then be obtained from the output shaft 3. At the same time, a reaction to the output which acts upon the output shaft 3 is transmitted through the reaction disc 4 and the valve plunger 2 to the input shaft, not shown. The output rises rapidly upon abutment of the reaction disc 4 against the valve plunger 2, and such rapid rise in the output is commonly referred to as a jumping.

In the present embodiment, the forward end face of the tubular portion 1b is formed with a pair of concentric inner and outer annular projections 1c, 1d with an annular groove 1e therebetween. An annular notch 1f is defined radially inwardly of the inner annular projection 1c. In this manner, the forward end face of the tubular portion 1b is substantially formed with an uneven surface.

On the other hand, the right-hand end face 4a of the reaction disc 4 which is adapted to abut against the forward end face of the tubular section 1b is formed with an unevenness which conforms to and engages the unevenness defined by the annular projections 1c, 1d on the forward end face of the tubular portion 1b. Specifically, around the outer periphery of the right-hand end face 4a, it is formed with an annular notch 4b which can be engaged by the annular projection 1d while an annular groove 4c is formed at a location radially inward of the notch 4b so that it may receive the annular projection 1c in a fitting engagement. The both annular projections 1c, 1d on the tubular portion 1b of the valve body 1 fit in the notch 4b and the annular groove 4c formed in the reaction disc 4 in a tight manner, or in a manner which leaves no clearance therebetween.

With the present embodiment constructed in the manner mentioned above, as the brake booster is actuated and the reaction disc 4 becomes axially compressed, the right-hand end face 4a of the reaction disc 4 intermeshes with the forward end face of the tubular portion 1b of the valve body 1 when the right-hand end face 4a of the reaction disc 4 tends to bulge toward the forward end face 2a of the valve plunger 2, thus presenting a resistance to an elastic deformation of the right-hand end face 4a of the reaction disc 4 in the radially inward direction. Accordingly, the reaction disc 4 bulges rightward and abuts against the forward end face 2a of the valve plunger 2 while experiencing a resistance to its elastic deformation.

When the booster changes from its actuated to its inoperative condition where the input shaft is retracted, the intermeshing engagement between the right-hand end face 4a of the reaction disc 4 and the tubular portion 1b of the valve body 1 allows the reaction disc 4 to be rapidly returned to its inoperative position.

Accordingly, in the present embodiment, an enhanced hysteresis can be achieved without increasing the hardness of the reaction disc 4. This allows a good brake feeling to be imparted to a driver.

Because an increase in the hardness of rubber which is used to form the reaction disc 4 is avoided, the likelihood that the magnitude of the jumping may grow excessively under low temperature conditions from its magnitude prevailing under normal temperatures is eliminated.

FIGS. 2 to 12 illustrate other embodiments of the invention.

SECOND EMBODIMENT

Figure 2:
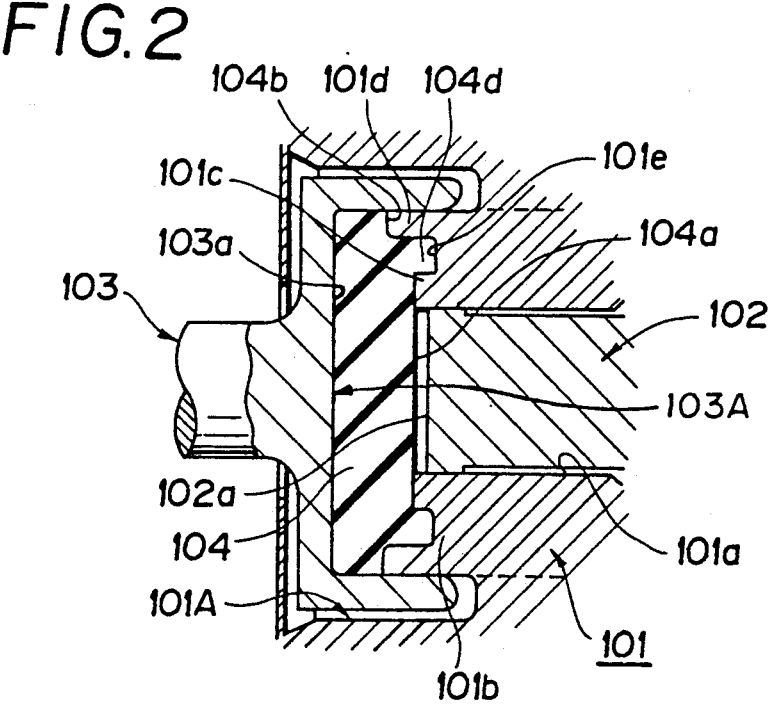
FIGS. 2 to 12 are similar sections illustrating other embodiments of the invention.

FIG. 2 shows a second embodiment of the invention in which the forward end face of a tubular portion 101b of a valve body 101 is formed with an annular groove 101e to provide a substantially uneven surface while a right-hand end face 104a of a reaction disc 104 is formed with an annular projection 104d which meshes with the annular groove 101e. While a notch as shown at 1f of the tubular portion 1b shown in the first embodiment is omitted in the tubular portion 101b of the second embodiment, the arrangement is substantially similar to the first embodiment in other respects. The second embodiment operates in the similar manner and achieves the similar effect as the first embodiment.

THIRD EMBODIMENT

Figure 3:
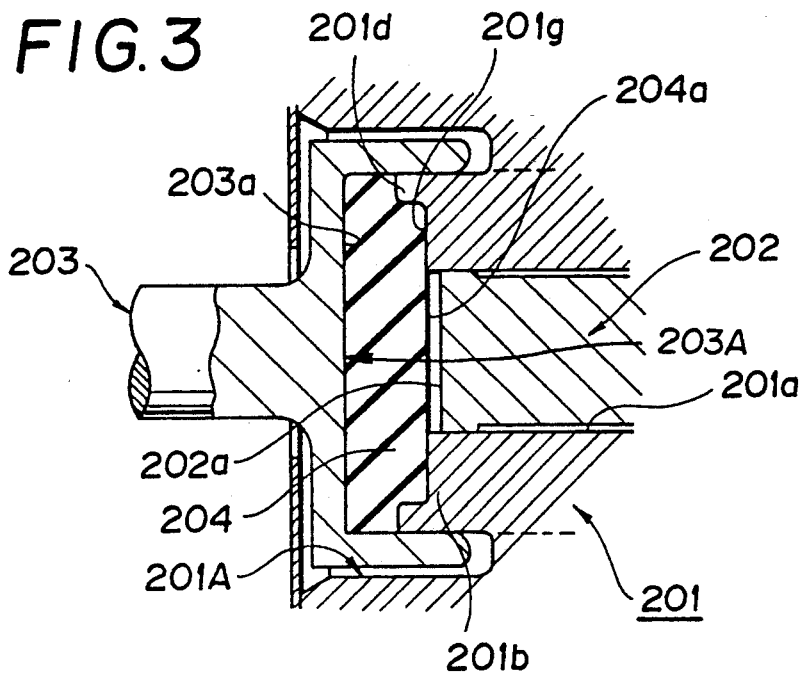

FIG. 3 shows a third embodiment of the invention in which a forward end face of a tubular portion 201b is formed with an annular notch around its inner periphery, the bottom 201g of which is formed with fine unevenness as may be envisioned by a sand paper, for example. A right-hand end face 204a of a reaction disc 204 which abuts against the bottom 201g of the notch is also formed with fine unevenness to allow a meshing engagement therebetween. In other respects, the arrangement is similar to the second embodiment, but operates in the similar manner and achieves the similar effect as the first embodiment.

FOURTH EMBODIMENT

Figure 4:
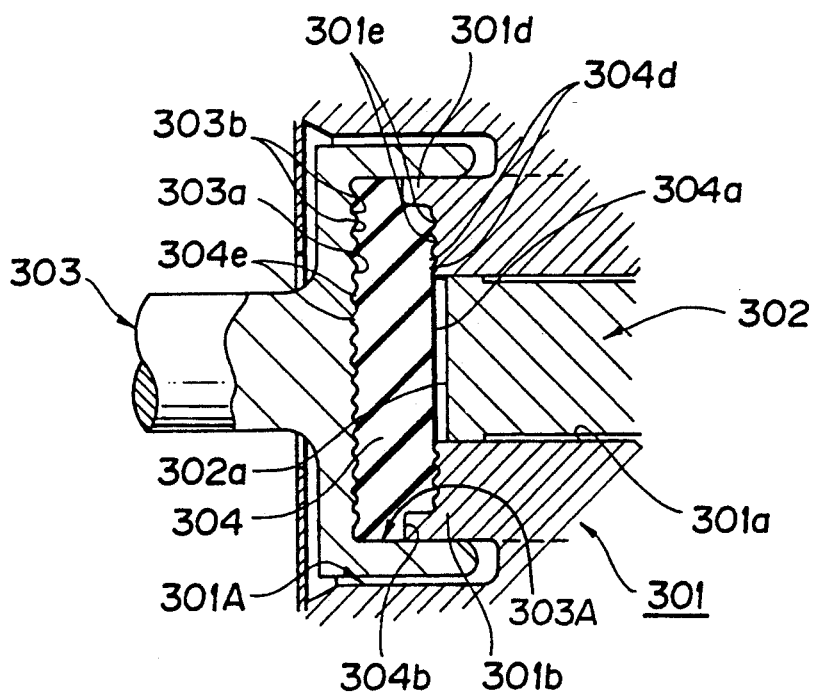

FIG. 4 shows a fourth embodiment of the invention in which the fine unevenness formed on the bottom 201g of the notch shown in the third embodiment is replaced by a plurality of concentric, annular grooves 301e formed in the bottom of the notch in a tubular portion 301b. An end face 303a of a recess 303A formed in an output shaft 303 is similarly formed with a plurality of concentric, annular grooves 303b.

In the fourth embodiment, a right-hand end face 304a of a reaction disc 304 is formed with a plurality of annular projections 304d, which conform to the configuration of annular grooves 301e formed in the tubular portion 301b, thus achieving a meshing engagement with the annular grooves 301e in the tubular portion 301b. At the same time, a left-hand end face of the reaction disc 304 is formed with a plurality of annular projections 304e, which conform to the configuration of the annular grooves 303b in the output shaft 303 for meshing engagement therewith. The fourth embodiment thus constructed operates in the similar manner and achieves the similar effect as the first embodiment. It is to be noted that the plurality of annular grooves 303b in the input shaft 303 and the associated annular projections 304e formed in the left-hand end face of the reaction disc 304 may be omitted.

FIFTH EMBODIMENT

Figure 5:
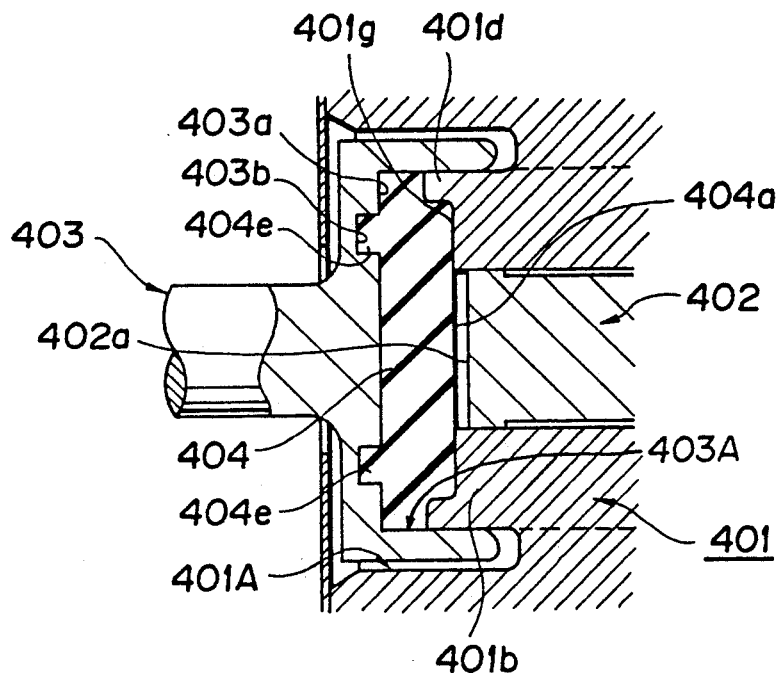

FIG. 5 shows a fifth embodiment of the invention in which an end face 403a of a recess 403A of an output shaft 403 is formed with a single annular groove 403b which is aligned with the axis thereof to provide a substantially uneven surface for the end face 403a. In a corresponding manner, a left-hand end face of a reaction disc 404 is formed with an annular projection 404e which meshingly engages the annular groove 403b. In the fifth embodiment, the bottom 401g of a notch in a tubular portion 401b and the forward end face of an annular projection 401d which is located radially outward thereof are formed as smoothly flat surfaces, as is the right-hand end face of the reaction disc 404 which abuts against them. Again, the arrangement of the fifth embodiment operates in the similar manner and achieves the similar effects as the first embodiment.

SIXTH EMBODIMENT

Figure 6:
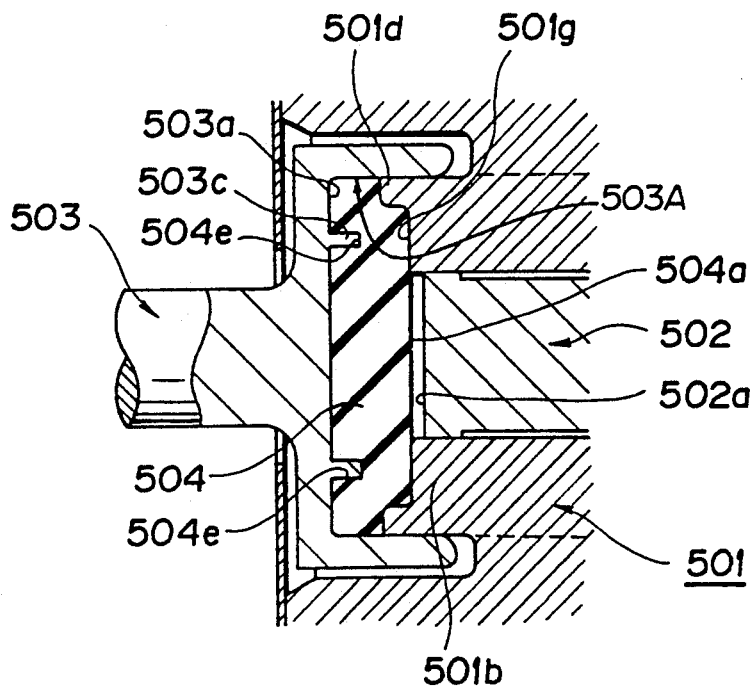

FIG. 6 shows a sixth embodiment of the invention in which an end face 503a of a recess 503A of an output shaft 503 is formed with a single annular projection 503c which is aligned with the axis thereof to provide a substantially uneven surface for the end face 503a. In a corresponding manner, a left-hand end face of a reaction disc 504 is formed with an annular groove 504e which meshingly engages the annular projection 503c. In other respects, the arrangement is similar to the embodiment shown in FIG. 5. Again, the arrangement of the sixth embodiment operates in the similar manner and achieves the similar effect as the first embodiment.

It is to be noted that in the fifth and the sixth embodiment, the external diameters, the heights and the radial thicknesses of the annular projections 404e, 503c may be changed to adjust the magnitude of the hysteresis effect.

SEVENTH EMBODIMENT

Figure 7:
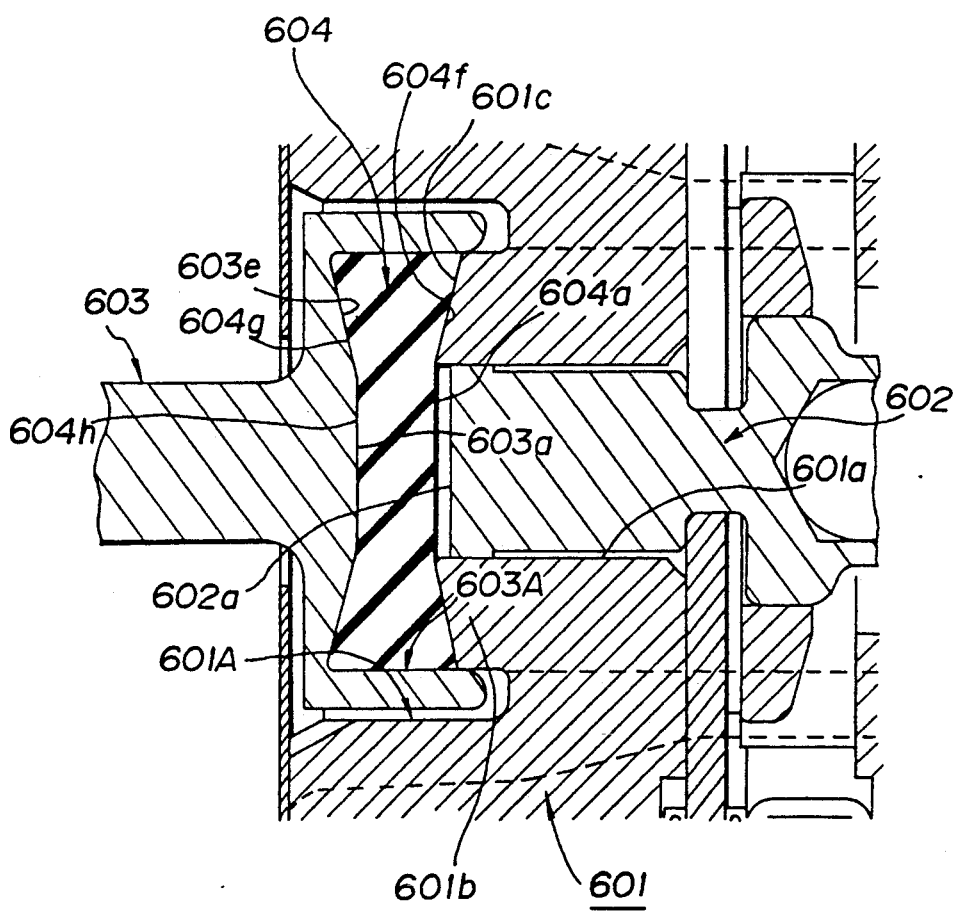

FIG. 7 shows a seventh embodiment of the invention in which both end faces 604a, 604h of a reaction disc 604 are formed with tapered surfaces 604f, 604g in their peripheral region as are a forward end face of a tubular portion 601b and a bottom 603a of a recess 603A of an output shaft 603, thus providing tapered surfaces 601c, 603e which abuts against the tapered surfaces 604f, 604g, respectively. In this manner, substantially uneven surfaces are provided for the forward end face (tapered surface 601c) of the tubular portion 601b and the end face 603a of the recess 603A of the output shaft 603.

Considering the construction of the reaction disc 604 in more detail, the right-hand end face 604a is formed as a flat surface only in its axial portion where it bears against a valve plunger 602 while the remainder, which is located radially outward of the flat surface is formed as a gently tapered surface 604f in which the outer edge is axially located to the right of the inner edge. The tapered surface 601c on the tubular portion 601b is also provided as a gently tapered surface in which the inner edge is located axially to the left of the outer edge in conformity to the angle of the tapered surface 604f of the right-hand end face 604a. On the other hand, the left-hand end face 604h of the reaction disc 604 is formed as a flat surface in its axial portion while the remainder which is located radially outward of the flat surface is provided as a gently tapered surface 604g in which the outer edge is located axially to the left of the inner edge thereof. The end face 603a of the recess 603A of the output shaft 603 includes a flat surface in its axial portion which bulges to the right, and the remainder which is located radially outward thereof is provided as the tapered surface 603e in which the inner edge is located axially to the right of the outer edge thereof, generally in conformity to the configuration of the left-hand end face 604h of the reaction disc 604. The entire end face 603a of the recess 603A abuts against the left-hand end face 604h of the reaction disc 604.

Again, the seventh embodiment is effective to operate and function in the similar manner as the first embodiment. In addition, by changing the angle of inclination of the both tapered surfaces 604f, 604g of the reaction disc 604, the angle of inclination of the tapered surface 601c of the valve body 601 which abuts against the tapered surface 604f, the angle of inclination of the tapered surface 603e of the output shaft 603 which abuts against the tapered surface 604g, and the cross-sectional configuration of the inner edge of the tapered surface 601c on the valve body 601, it is easily possible to change the magnitude of the hysteresis.

The described operation and function can also be served by an arrangement in which the right-hand end face 604a of the reaction disc 604 is formed as a flat surface which is perpendicular to the axis over the entire region thereof as is the forward end face of the tubular portion 601b which abuts against the right-hand end face 604a, namely, an arrangement in which the reaction disc 604 is only provided with the tapered surface 604g on its left-hand end face 604h which abuts against the tapered surface 603g of the output shaft 603.

EIGHTH EMBODIMENT

Figure 8:
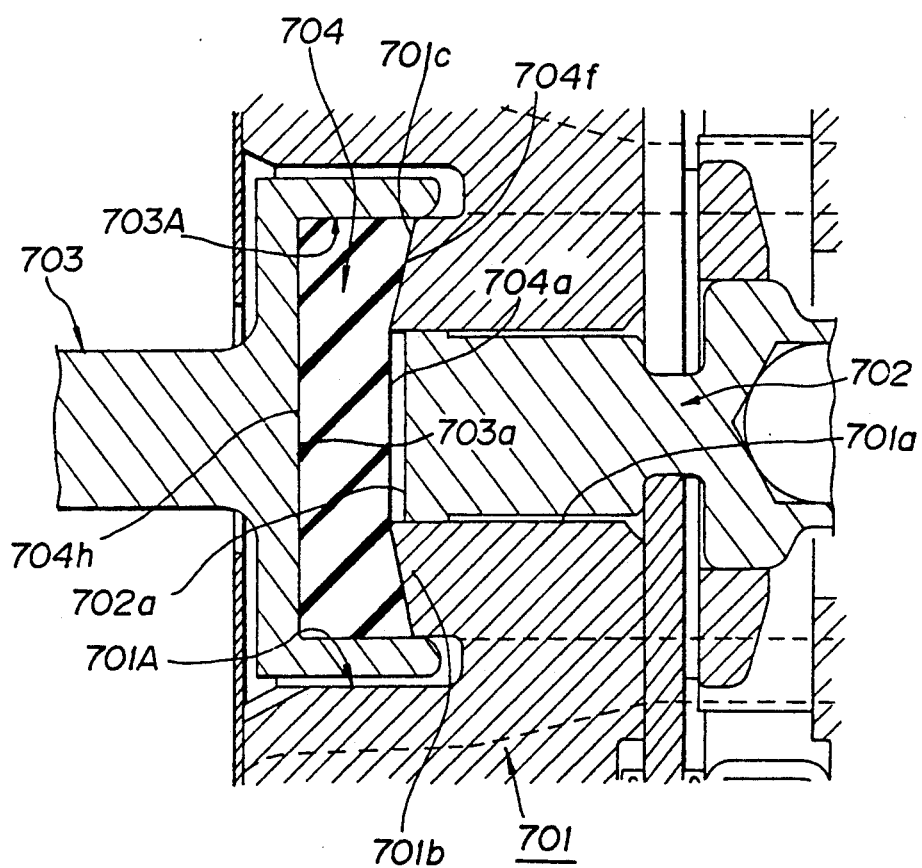

FIG. 8 shows an eighth embodiment of the invention in which the tapered surface 603e of the output shaft 603 shown in the seventh embodiment is omitted, thus, a left-hand end face 704h of a reaction disc 704 is entirely provided as a flat surface, and an end face 703e of a recess 703A of an output shaft 703 which abuts against it is also entirely formed as a flat surface. In other respects, the arrangement is similar to that of the seventh embodiment, and functions in the same manner as the seventh embodiment.

NINTH EMBODIMENT

Figure 9:
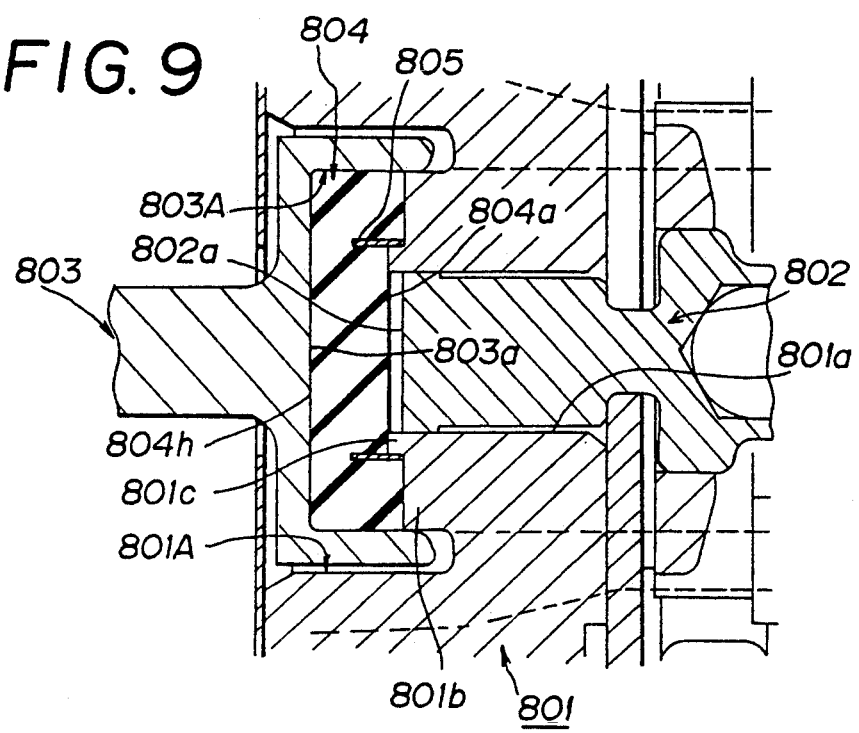

Referring to FIG. 9, a ninth embodiment of the invention will be described. In the ninth embodiment, a reaction disc 804 has an annular member 805 embedded therein which exhibits a larger hardness than the reaction disc 804. Specifically, the reaction disc 804 has a right-hand end face 804a in which an annular member 805 formed of a metal is integrally embedded in alignment with the axes of the reaction disc 804 and a valve plunger 802.

The external diameter of the annular member 805 is chosen to be greater than the external diameter of a forward end of the valve plunger 802. The right end of the annular member 805 is disposed to be co-planar with the right-hand end face 804a of the reaction disc 804 which is disposed radially outward of the annular member 805. At its right end, a portion of the reaction disc 804 which is located radially inward of the annular member 805 is removed to expose it through a given axial dimension. An annular projection 801c is formed around the inner edge of the front end face of the tubular portion 801b, and fits inside the exposed inner peripheral surface of the annular member 805 located at its right end.

In this manner, the annular member 805 is supported by the annular projection 801c on the valve body 801 and is prevented from being displaced in the radial direction. Simultaneously, the forward end face of the tubular portion 801b, inclusive of the forward end face of the annular projection 801c, is disposed in abutment against the right end of the annular member 805 and the right-hand end face 804a of the reaction disc 804 which is disposed radially inward and outward of the annular member 805. Since the left end of the annular member 805 is located at the center of the axial length of the reaction disc 804, it does not hamper an elastic deformation of the reaction disc 804 in the axial direction. The arrangement of the ninth embodiment also operates and functions in the similar manner as the eighth embodiment.

In addition, since the inner periphery of the annular member 805 which is embedded in the reaction disc 804 is exposed at its right end, such inner periphery of the annular member 805 at its right end can be utilized for positioning the annular member 805 within the reaction disc 804 during the manufacturing of the latter. Accordingly, with the arrangement of the ninth embodiment, a variation in the position where the annular member 805 is embedded may be prevented as compared with the conventional arrangement in which the annular member 805 is entirely embedded within the reaction disc 804. Also, the exposed inner periphery of the annular member 805 at its right end is prevented from being displaced in the radial direction by the provision of the annular projection 801c on the valve body 801, so that when the reaction disc 804 is subject to a compressive deformation, a displacement of the annular member 805 in the radial direction within the reaction disc 804 can also be prevented, thus contributing to diminishing a variation in the magnitude of the hysteresis which may occur from reaction disc 804 to disc.

TENTH EMBODIMENT

Figure 10:
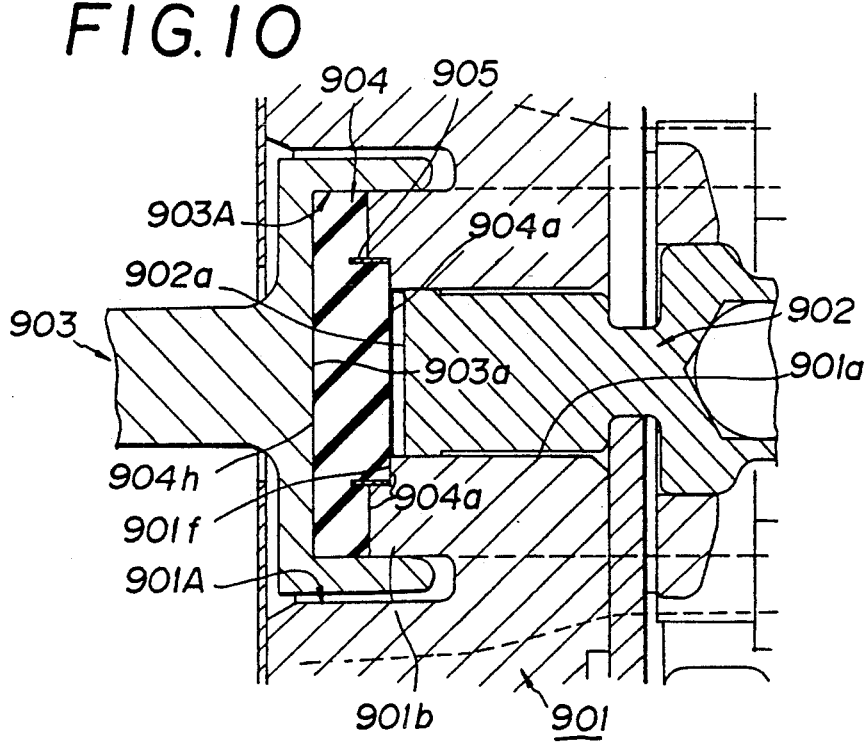

FIG. 10 shows a tenth embodiment of the invention. In the tenth embodiment, an annular member 905 is integrally embedded in the right-hand end face 904a of a reaction disc 904, and subsequently, a portion of the reaction disc 904 which is disposed radially outward of the annular member 905 is notched or removed continuously in the circumferential direction to expose the outer periphery of the annular member 905 at its right end, in opposite manner to the arrangement of the ninth embodiment. The outer periphery of the annular member 905 fittingly engages the peripheral surface of a circumferential notch 901f formed around the inner edge of the forward end face of the tubular portion 901b, at its right end. Under this condition, the right-hand end face 904a of the reaction disc 904 entirely abuts against the forward end face of the tubular portion 901b including the bottom of the notch 901f in a region both outside and inside the annular member 905.

In other respects, the arrangement is similar to the ninth embodiment, and the arrangement of the tenth embodiment also operates and functions in the same manner as the ninth embodiment.

ELEVENTH EMBODIMENT

Figure 11:
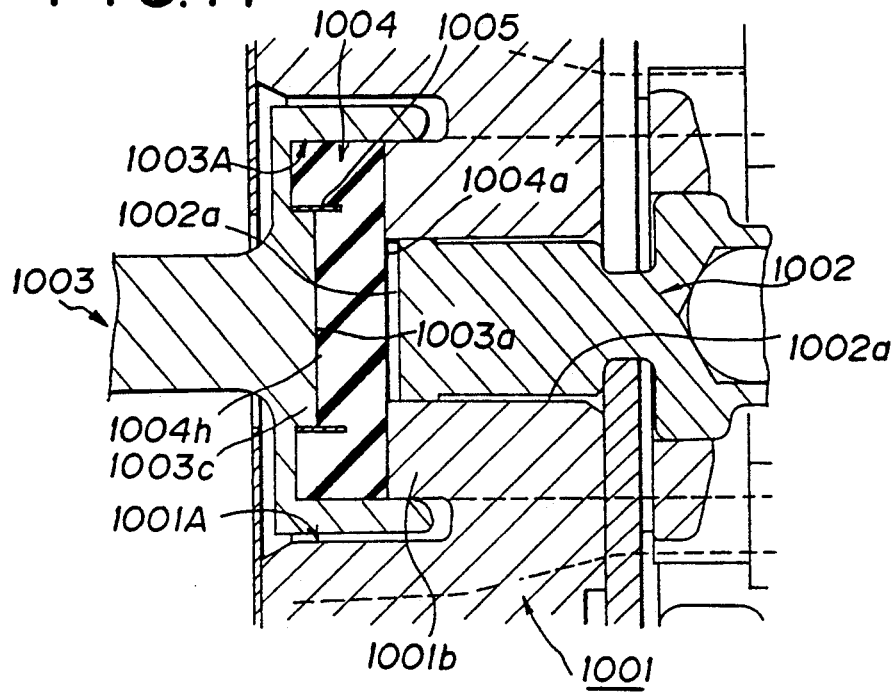

FIG. 11 shows an eleventh embodiment of the invention in which an annular member 1005 is embedded in the left-hand end face 1004h of a reaction disc 1004 rather than in the right-hand end face as shown in the ninth embodiment shown in FIG. 9. In this embodiment, an end face 1003a of an output shaft 1003 is formed, in its axial portion, with a circular projection 1003c which bulges to the right and fittingly engages the inner periphery of the annular member 1005 at its left end. The right end of the annular member 1005 is located at the axial center of the reaction disc 1004. It is to be noted that the right-hand end face 1004a of the reaction disc 1004 is entirely formed as a flat surface as is the forward end face of the tubular portion 1001b of a valve body 1001 which abuts against it.

In other respects, the arrangement is similar to the ninth embodiment, and the arrangement of the eleventh embodiment also operates and functions in the same manner as the ninth embodiment.

TWELFTH EMBODIMENT

Figure 12:
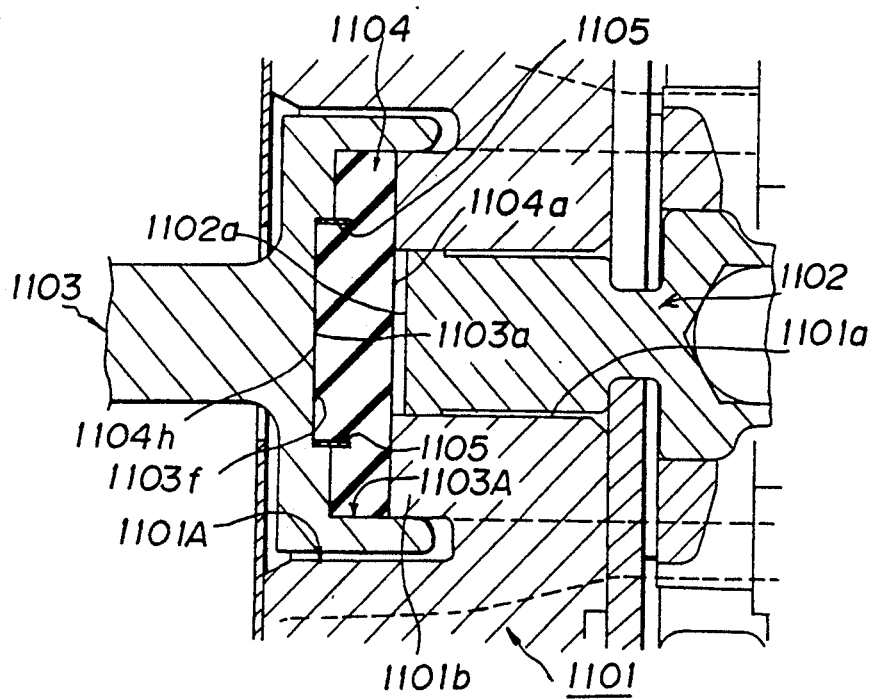

Finally, FIG. 12 shows a twelfth embodiment of the invention in which an annular member 1105 is embedded in a left-hand end face 1104h of a reaction disc 1104 in opposite manner to the illustration of FIG. 10.

Specifically, the left-hand end face 1104h of the reaction disc 1104 has the annular member 1105 integrally embedded therein, and a portion of the reaction disc 1104 which is disposed radially outward of the annular member 1105 is notched continuously in the circumferential direction to expose the outer periphery of the annular member 1105 at its left end. A recess 1103A of an output shaft 1103 has an end face 1103a in which a circular recess 1103f is formed, in which the left end of the annular member 1105, at its outer periphery, is fittingly engaged.

It is to be noted that the right hand end face 1104a of the reaction disc 1104 is entirely provided as a flat surface as is the forward end face of a tubular portion 1101b of the valve body 1101 which abuts against it.

In other respects, the arrangement is similar to the tenth embodiment, and the arrangement of the twelfth embodiment also operates and functions in the same manner as the ninth embodiment.

It is to be noted that a material used to form the annular member shown in the ninth to the twelfth embodiment may comprise a synthetic resin or hard rubber, the only requirement being that it exhibits a greater hardness than the material used to form the reaction disc.

While the invention has been shown and described above in connection with several embodiments thereof, it should be understood that the above disclosure in exemplary only, and is not to be construed as limiting the invention, the scope of which is solely defined by the appended claims.

What is claimed is:

1. A brake booster comprising a valve body slidably disposed within a shell and having a shaft portion with an axial bore and having an annular axial end disposed about said axial bore, said axial end having an end face, a valve plunger slidably fitted in said axial bore and mechanically coupled to an input shaft, an output shaft having a recessed stem portion slidably fitted on said axial end, said stem portion having an end face disposed in opposing relationship with the end face of said axial, end, and a reaction disc disposed in said recessed stem portion such that one disc end face is engaged by the end face of said axial end and a second disc end face is engaged by the end face of said stem portion in opposing relationship with a forward end face of the valve plunger for transmitting a reaction to an output which acts upon the output shaft to the input shaft through the valve plunger, with a clearance being formed between the reaction disc and the valve plunger in an inoperative condition of the booster when the input shaft is not driven forward;

characterized in that at least one of the end face of said axial end of said valve body and the end face of said stem portion of said output shaft includes an uneven surface; and at least one of said one disc end face and said second disc end face includes an uneven disc surface configured complementary to said uneven surface, said uneven surface and said complementary uneven disc surface being engaged to prevent elastic deformation of the reaction disc in a direction from the outside toward the inside thereof.

2. A booster according to claim 1 in which the uneven surface is formed only on the end face of said axial end of the valve body.

3. A booster according to claim 2 in which the uneven surface is formed by an annular projection or an annular groove formed on or in the end face of said axial end of the valve body, said annular projection or annular groove meshingly engaging a respective annular groove or annular projection formed in or on said one end face of the reaction disc.

4. A booster according to claim 2 in which the uneven surface comprises an annular notch formed in the end face of said axial end of the valve body along its inner peripheral edge, and an annular projection which is located radially outward of and continues from the notch.

5. A booster according to claim 2 in which the uneven surface is defined by a tapered surface in which the inner peripheral edge is located forwardly of its outer peripheral edge.

6. A booster according to claim 1 in which the uneven surface is formed only on the end face of the stem portion of the output shaft where it abuts against said second end face of the reaction disc.

7. A booster according to claim 6 in which the uneven surface comprises an annular groove or an annular projection formed in or on the end face of said stem portion of the output shaft, said annular groove or annular projection meshingly engaging a respective annular projection or annular groove formed on or in said second end face of the reaction disc.

8. A booster according to claim 6 in which the uneven surface comprises a tapered surface in which the inner peripheral edge is located axially rearward of the outer peripheral edge, and a flat surface which is disposed radially inward of the tapered surface.

9. A brake booster comprising a valve body slidably disposed within a shell, a valve plunger slidably fitted into the valve body and mechanically coupled to an input shaft, an output shaft having its one end slidably fitted in the valve body and having such end disposed in opposing relationship with a forward end face of the valve plunger, and a reaction disc interposed between said one end of the output shaft and an end face of the valve body in opposing relationship with the forward end face of the valve plunger for transmitting a reaction to an output which acts upon the output shaft to the input shaft through the valve plunger, with a clearance being formed between the reaction disc and the valve plunger in an inoperative condition of the booster when the input shaft is not driven forward;

characterized in that the end face of said valve body includes an uneven surface comprising an annular notch along an inner peripheral edge and an annular projection disposed radially outward of and continuing from said notch, and said reaction disc includes an end face having a region abutting a bottom of said notch, the reaction disc end face region and the bottom of said notch each including fine unevenness where they are abutted such that said reaction disc and said valve body are intermeshed to prevent elastic deformation of said reaction disc in a direction from the outside toward the inside thereof.

10. A brake booster comprising a valve body slidably disposed within a shell, a valve plunger slidably fitted into the valve body and mechanically coupled to an input shaft, an output shaft having its one end slidably fitted in the valve body and having such end disposed in opposing relationship with a forward end face of the valve plunger, and a reaction disc interposed between said one end of the output shaft and an end face of the valve body in opposing relationship with the forward end face of the valve plunger for transmitting a reaction to an output which acts upon the output shaft to the input shaft through the valve plunger, with a clearance being formed between the reaction disc and the valve plunger in an inoperative condition of the booster when the input shaft is not driven forward;

characterized in that the end face of said valve body includes an uneven surface comprising an annular notch along an inner peripheral edge and an annular projection disposed radially outward of and continuing from said notch, and said reaction disc includes an end face having a region abutting a bottom of said notch, said bottom of said notch including a plurality of annular grooves where it is engaged by the reaction disc and said reaction disc end face region including a plurality of annular projections that are complementary to said annular grooves so as to be in meshing engagement therewith no prevent elastic deformation of said reaction disc in a direction from the outside toward the inside thereof.

11. A brake booster comprising a valve body slidably disposed within a shell, a valve plunger slidably fitted into the valve body and mechanically coupled to an input shaft, an output shaft having its one end slidably fitted in the valve body and having such end disposed in opposing relationship with a forward end face of the valve plunger, and a reaction disc interposed between said one end of the output shaft and an end face of the valve body in opposing relationship with the forward end face of the valve plunger for transmitting a reaction to an output which acts upon the output shaft to the input shaft through the valve plunger, with a clearance being formed between the reaction disc and the valve plunger in an inoperative condition of the booster when the input shaft is not driven forward;

characterized in that the end face of said valve body includes an uneven surface comprising an annular notch along an inner peripheral edge and an annular projection disposed radially outward of and continuing from said notch, said reactive disc having an end face and an annular member embedded therein in concentric relationship with said reaction disc, said annular member having an outer peripheral surface exposed at its rear end and fittingly engaged with a peripheral surface of said notch at a rear end thereof, the reaction disc end face being entirely in abutment against said uneven surface both outside and inside said annular member to prevent elastic deformation of said reaction disc in a direction from the outside toward the inside thereof.

12. A booster comprising a valve body slidably disposed within a shell, a valve plunger slidably fitted into the valve body and mechanically coupled to an input shaft, an output shaft having its one end slidably fitted in the valve body and having such end disposed in opposing relationship with a forward end face of the valve plunger, and a reaction disc interposed between said one end of the output shaft and an end face of the valve body in opposing relationship with the forward end face of the valve plunger for transmitting a reaction to an output which acts upon the output shaft to the input shaft through the valve plunger, with a clearance being formed between the reaction disc and the valve plunger in an inoperative condition of the booster when the input shaft is not driven forward;

characterized in that the one end of said output shaft includes an end face abutting an end face of said reaction disc, said end face of said output shaft including an uneven surface comprising an annular projection and an annular groove disposed radially outward of and continuing from said annular projection, said reaction disc having an annular member embedded in said end face thereof in concentric relationship with said reaction disc, said annular member having an inner peripheral surface exposed at its front end, and fittingly engaged with said annular projection such that the reaction disc end face is entirely in abutment against said uneven surface both outside and inside said annular member to prevent elastic deformation of said reaction disc in a direction from the outside toward the inside thereof.

13. A booster comprising a valve body slidably disposed within a shell, a valve plunger slidably fitted into the valve body and mechanically coupled to an input shaft, an output shaft having its one end slidably fitted in the valve body and having such end disposed in opposing relationship with a forward end face of the valve plunger, and a reaction disc interposed between said one end of the output shaft and an end face of the valve body in opposing relationship with the forward end face of the valve plunger for transmitting a reaction to an output which acts upon the output shaft to the input shaft through the valve plunger, with a clearance being formed between the reaction disc and the valve plunger in an inoperative condition of the booster when the input shaft is not driven forward;

characterized in that said one includes an end face abutting an end face of said reaction disc, said end face of said output shaft including an uneven surface comprising an annular recess and a flat surface disposed radially outward of and continuing from said annular recess, said reaction disc having an annular member embedded in said end face thereof in concentric relationship with said reaction disc, said annular member having an outer peripheral surface exposed at its front end and fittingly engaged in said annular recess such that the reaction disc end face is entirely in abutment against said uneven surface both inside and outside said annular member to prevent elastic deformation of said reaction disc in a direction from the outside toward the inside thereof.

14. A booster comprising a valve body slidably disposed within a shell and having a shaft portion with an axial bore and having an annular axial end disposed about said axial bore, said axial end having an end face, a valve plunger slidably fitted in said axial bore and mechanically coupled to an input shaft, an output shaft having a recessed stem portion slidably fitted on said axial end, said stem portion having an end face disposed in opposing relationship with the end face of said axial end, and a reaction disc disposed in said recessed stem portion such that one disc end face is engaged by the end face of said axial end and a second disc end face is engaged by the end face of said stem portion in opposing relationship with a forward end face of the valve plunger for transmitting a reaction to an output which acts upon the output shaft to the input shaft through the valve plunger, with a clearance being formed between the reaction disc and the valve plunger in an inoperative condition of the booster when the input shaft is not driven forward;

characterized in that said end face of said axial end of the valve body and said one end face of the reaction disc include opposing uneven surfaces that have complementary configurations in engagement to prevent elastic deformation of the reaction disc in a direction from the outside toward the inside thereof.

15. A booster comprising a valve body slidably disposed within a shell and having a shaft portion with an axial bore and an annular axial end disposed about said axial bore, said axial end having an end face, a valve plunger slidably fitted in said axial bore and mechanically coupled to an input shaft, an output shaft having a recessed stem portion slidably fitted on said axial end, said stem portion having an end face disposed in opposing relationship with the end face of said axial end, and a reaction disc disposed in said recessed stem portion such that one disc end face is engaged by the end face of said axial end and a second disc end face is engaged by the end face of said stem portion in opposing relationship with a forward end face of the valve plunger for transmitting a reaction to an output which acts upon the output shaft to the input shaft through the valve plunger, with a clearance being formed between the reaction disc and the valve plunger in an inoperative condition of the booster when the input shaft is not driven forward;

characterized in that said end face of said stem portion of the output shaft and said second end face of the reaction disc include opposing uneven surfaces that have complementary configurations in engagement to prevent elastic deformation of the reaction disc in a direction from the outside toward the inside thereof.

* * * * *

UNITED STATES PATENT AND TRADEMARK OFFICE
CERTIFICATE OF CORRECTION

PATENT NO.   :   5 263 398
DATED        :   November 23, 1993
INVENTOR(S)  :   Kazuo KOBAYASHI et al It is certified that error appears in the above-identified patent and that said Letters Patent is hereby corrected as shown below:

On the title page, item [75] Inventors:
    change "Saitama, Japan" to ---Saitama-ken, Japan---.
Column 8, line 48; change "said axial, end," to ---said axial end,---.
Column 10, line 26; change "no" to ---to---.
Column 11, line 40; after "one" insert ---end of said output shaft---.

Signed and Sealed this

Twenty-fourth Day of May, 1994

BRUCE LEHMAN

*Attest:*

*Attesting Officer*   Commissioner of Patents and Trademarks